Jan. 6, 1970   J. A. MUNDER ET AL   3,488,206
METHOD OF COATING THE INTERIOR SURFACE OF A POROUS PIPE
Filed Dec. 29, 1966
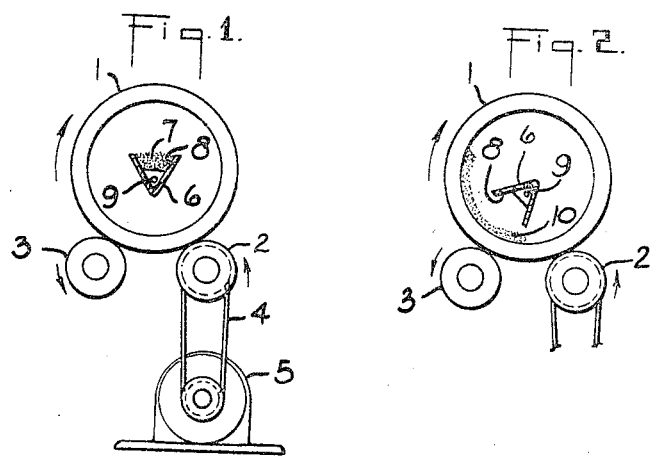
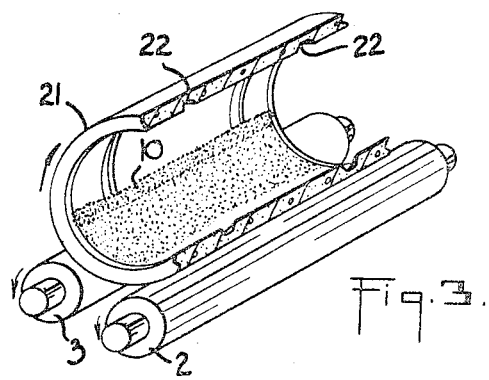
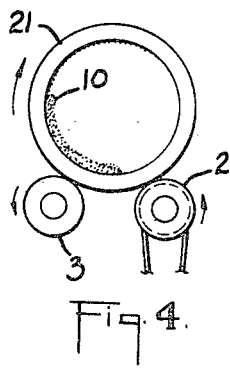
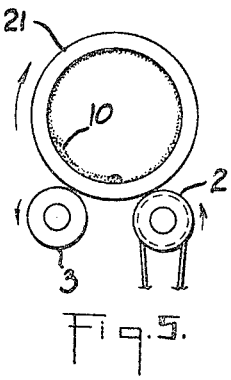
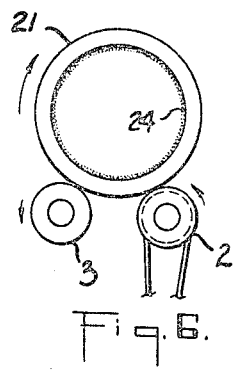
INVENTORS
JOSEPH ANTHONY MUNDER
BY EDWIN AUBURN CLOUD
John A. McKinney
ATTORNEY United States Patent Office 3,488,206
Patented Jan. 6, 1970

3,488,206
METHOD OF COATING THE INTERIOR SURFACE OF A POROUS PIPE
Joseph Anthony Munder, Belle Mead, and Edwin Auburn Cloud, Somerville, N.J., assignors to Johns-Manville Corporation, New York, N.Y., a corporation of New York
Filed Dec. 29, 1966, Ser. No. 605,907
Int. Cl. B44d 1/094; B05c 11/12
U.S. Cl. 117—18                      2 Claims

ABSTRACT OF THE DISCLOSURE

A method for applying coating material in dry, flowable, particulate form to the entire interior of a heated tubular conduit, including one having annular grooves in its inner surface, by depositing said coating material onto a minor arcuate section of the inner surface of the conduit, rotating said conduit at a speed whereby portions of the coating material will fall back over the next succeeding arcuate section and continuing to rotate the conduit until the coating material has been changed into a uniform coating over the entire surface of the conduit.

This invention relates to a fluid conduit, such as pipe, provided with a coating on its inner surface, and to a method for producing such conduit. Although the invention is particularly described in relation to porous pipe, such as fibro-cement pipe, it is to be understood that the inventive concepts described herein are equally applicable in providing a coating to a fluid conduit comprising any material. As described below, the invention is specifically directed to the application of a thermosetting or thermoplastic coating material in dry, powdered, particulate form to the inner surface of a heated fluid conduit, and wherein the coating material is distributed and melted over and onto the surface of the fluid conduit to provide a smooth, continuous, and fluid-impervious coating of uniform thickness thereon.

Various methods and apparatus have been proposed for the application of a coating material to a fluid conduit especially to the providing of a coating on the inner surface of such conduit. In Hucks, U.S. Patent No. 3,219,472, a liquid thermosetting resin coating material is sprayed onto the inner surface of a pipe with both the resin and the pipe being at a temperature greater than ambient. The applied coating material is distributed evenly over the inner surface of the pipe and held in place until cured to a point of resisting flow or slumping by centrifugal force. In Davis, U.S. Patent No. 3,004,861, a fluidized bed of powdered thermoplastic resin material is used to apply the resinous coating material to the inner or outer surface of a metal pipe which has been raised to a temperature greater than the temperature at which the thermoplastic resinous material will melt. In Spraul et al., U.S. Patent No. 3,230,105, a quantity of powdered thermoplastic material is deposited into a screen member which is positioned within a tubular member, which tubular member has been raised to a temperature greater than the temperature at which the thermoplastic resinous material will melt. The screen and the tubular member are each rotated so as to distribute the powdered thermoplastic resinous material over the inner surface of the tubular member. A common disadvantage found in all of these systems is that each system requires an elaborate system for distributing the resinous coating material on the surface of the object to be coated. Another disadvantage in each of these systems is that it is extremely difficult to provide generally radially extending surfaces with a proper coating.

The primary object of this invention is to provide a relatively simple yet efficient system for distributing a resinous coating material over the inner surface of a tubular conduit so as to provide the tubular conduit with a smooth, continuous, and fluid-impervious coating of uniform thickness.

Another object of this invention is to provide an effective system for providing a smooth, continuous, and fluid-impervious coating of uniform thickness to generally radially extending portions of the inner surface of a tubular fluid conduit.

In brief, the foregoing objects are obtained in the present invention by dumping a quantity of powdered thermoplastic resin onto the lower portion of the inner surface of a rotating tubular conduit. The dumped resin forms an accumulation of resinous material over a minor arcuate section of the inner surface of the tubular conduit along the axial extent thereof. The tubular conduit is rotated at a rotational speed less than the rotational speed at which the uniform accumulation of resinous material would be held in deposited position by centrifugal force so that portions of the accumulation of resinous material will fall back over the next succeeding sections of the tubular conduit in a direction opposite to the direction of rotation of the tubular conduit while other portions of the resinous material melt and adhere to the inner surface of the tubular conduit. The rotation of the tubular conduit is continued until all of the deposited resinous material has been melted and the inner surface of the tubular conduit has been provided with a smooth, continuous, and fluid-impervious coating of uniform thickness.

The invention will be more fully understood and further objects and advantages thereof will become apparent when reference is made to the following detailed description of a preferred embodiment of the invention and the accompanying drawings in which:

FIG. 1 is an end elevation of apparatus suitable for carrying out the method of the invention and illustrates the conditions before the resinous coating material is dumped;

FIG. 2 is similar to FIG. 1 and illustrates the condition after the resinous coating material has been dumped;

FIG. 3 is a pictorial representation of the coating material being applied to the inner surface of a tubular conduit having a pair of spaced annular grooves therein; and FIGS. 4-6, inclusive, illustrate the gradual transformation of an accumulation of resinous coating material into a coating on the entire inner surface of the tubular conduit illustrated in FIG. 3.

Referring to the drawings, there is illustrated in FIG. 1 apparatus adapted to perform the method of the instant invention so as to provide a fluid conduit, which in the preferred embodiment comprises a porous fibro-cement pipe, having on the inner surface thereof a smooth, continuous, and fluid-impervious coating of uniform thickness. A fibro-cement pipe 1 is supported on rollers 2 and 3 for rotation thereon. The roller 2 is supported in the position shown for rotation in suitably mounted conventional journal boxes (not shown) and is rotated by a conventional drive belt 4 which is connected to a suitable source of power 5, such as a variable speed motor. The arrangement is such that the speed of rotation of the roller 2 can be varied selectively and controlled as desired. The roller 3 is journalled for rotation by suitably supported conventional journal boxes (not shown) which are mounted for adjustment in a horizontal plane. The adjustment of the roller 3 allows the apparatus to accommodate different sizes of fibro-cement pipe for rotation on the rollers 2 and 3. A trough 6 having an axial extent at least as great as the axial extent of the fibro-cement pipe is supported on conventional mechanism, such as a hydraulic piston (not shown), so that it may be inserted into and withdrawn from a position within the fibro-cement pipe 1. The trough 6 carries a resinous coating material 7 in a cavity 8. The trough 6 is secured to a rotatable rod 9 so that the trough 6 may be rotated from the position illustrated in FIG. 1 to the position illustrated in FIG. 2 so as to dump the resinous coating material onto the inner surface of the fibro-cement pipe 1 to cooperate with the rotation of the pipe in forming an accumulation 10 of the resinous coating material over a minor arcuate section of the inner surface of the fibro-cement pipe 1.

In accordance with the method of the instant invention, a fibro-cement pipe is raised to a temperature, throughout the pipe, which is greater than the temperature at which the resinous coating material will melt, placed on the rollers 2 and 3, and rotated at a predetermined speed by the roller 2 driven by the power source 5. During the rotation of the pipe, the trough 6 carrying a supply of resinous coating material in its cavity 8 sufficient to form a coating of desired thickness on the inner surface of the fibro-cement pipe is inserted within the fibro-cement pipe. When the trough 6 is properly positioned within the pipe, it is rotated from the position illustrated in FIG. 1 to the position illustrated in FIG. 2 so as to dump the resinous coating material 7 onto the inner surface of the rotating fibro-cement pipe to form an accumulation 10 of the resinous coating material on a minor arcuate section of the inner surface of the fibro-cement pipe along the axial extent thereof. The pipe is rotated at a rotational speed less than the rotational speed at which the accumulation of the resinous coating material would be held in the deposited position by centrifugal force so that portions of the accumulation of resinous coating material will fall back over the next succeeding sections of the inner surface of the fibro-cement pipe while other portions of the resinous coating material melt and adhere to the inner surface of the fibro-cement pipe. After all of the accumulation of resinous coating material has been melted, there has been formed on the inner surface of the fibro-cement pipe a smooth, continuous, and fluid-impervious coating of uniform thickness.

In practicing the method of the instant invention, there are certain procedures that should be followed. The surfaces of the fibro-cement pipe to be coated must be thoroughly cleaned preferably by sand blasting to remove surface imperfections therefrom. The fibro-cement pipe must be raised to a temperature greater than the temperature at which the resinous coating material will melt. The temperature of the fibro-cement pipe is important since the fibro-cement pipe cannot be heated or raised again in temperature after the resinous coating material has been applied without detrimental effect to the coating applied to the inner surface of the fibro-cement pipe. A fibro-cement pipe is at least semi-porous and must be thoroughly heated before the resinous coating material is applied so as to remove all moisture and air from the walls of the pipe. During the application of the resinous coating material, the fibro-cement pipe is in a state of cooling so that the temperature of the inner surface of the fibro-cement pipe is falling and causing a contraction of gases and vapors in the pipe so that a slight vacuum prevails in the walls of the fibro-cement pipe. This vacuum cooperates with the melting of the resinous coating material to effect a maximum penetration of the resinous coating material into the pores of the fibro-cement pipe adjacent the inner surface thereof to form an integral association and intitimate bonding of the resinous coating material and the fibro-cement pipe. If the pipe is reheated after coating, blow holes may result to mar the surface and usefullness of the resinous coating material of the fibro-cement pipe.

The instant invention is particularly suited for the application of thermosetting or thermoplastic resinous coating materials in dry, powdered, particulate form. The resinous coating materials which are particularly useful are those which gradually melt at a certain temperature to form a highly viscous liquid exhibiting little or no flow characteristics so that there will be no slumping of the coating material in melted form. However, prior to reaching the melting temperature, it is essential that the resinous coating material, in powdered form, have excellent flow characteristics so that the resinous coating material may be distributed evenly over the surface to be coated. The resinous coating materials described in the examples below are such that, when in dry, particulate form, they flow freely over the surface of the rotating fibro-cement pipe so as to be spread uniformly thereover but when they have been melted, they have such highly viscous liquid characteristics that the rotation of the pipe may be stopped as soon as all of the powdered resinous coating material has been melted with no slumping or other detrimental effect to the applied coating. Also, it has been found that the particle size of the resinous coating material is of significance in the formation of a smooth, continuous, and fluid-impervious coating of uniform thickness on the inner surface of the fibro-cement pipe. Another feature of the instant invention relates to the rotation of the fibro-cement pipe. It is important that the fibro-cement pipe be rotated at a rate of rotational speed less than the rotational speed which would produce sufficient centrifugal force to carry the dry, powdered, and particule resinous coating material with the pipe as the pipe is rotated. If this occurs, all of the resinous coating material would be applied only to one section of the fibro-cement pipe. On the other hand, the fibro-cement pipe must be rotated at a rate sufficient to carry a portion of the dry, powdered, and particulate resinous coating material up the wall of the pipe as it rotates and then allow portions of such resinous coating material to tumble back down onto the next succeeding section of the pipe. The ideal condition of the accumulation 10 of such resinous coating material is illustrated in FIG. 2 wherein the accumulation 10 is spread over an arcuate section of about 90°. Under these conditions, portions of the dry, powdered, and particulate resinous coating material will fall back upon the next succeeding section of the rotating pipe and melt thereon. It is further noted that the rotational speed of the fibro-cement pipe must be great enough so that several revolutions of the fibro-cemeent pipe will be made before all of the accumulation of the dry, powdered, and particulate resinous coating material has been melted. In this manner, a smooth, continuous, and fluid-impervious coating of uniform thickness will provided on the inner surface of the fibro-cement pipe.

In accordance with the instant invention, a plurality of fibro-cement pipes were provided with a coating on the inner surface thereof wherein each pipe had a inside diameter of 6 inches with a wall thickness of ⅝ inch and the rate of rotation of the pipe throughout the coating operation was approximately 10 revolutions per minute. The coating produced in each of the examples was well bonded, smooth, and ripple free throughout the inner surface of the pipe. The powdered resinous coating material was distributed evenly throughout the axial extent of the cavity of the trough 6 which was then inserted into the rotating fibre-cement pipe. The trough 6, which had an axial extent slightly greater than the axial extent of the fibro-cement pipe, was then rotated ot dump the resinous coating material onto the lower portion of the inner surface of the fibro-cement pipe. While the dumped resinous coating material was being distributed over the inner surface of the fibro-cement pipe, the trough 6 was rotated back to its original position withdrawn from within the pipe and filled with a new supply of powdered resinous coating material. In each instance, the fibro-cement pipe was rotated only until all of the dumped powdered resinous coating material had melted. After the rotation had ceased, the pipe was placed in a suitable dust-free storage area for cooling and curing of the melted resinous coating material. The foregoing operation provided each of the fibro-cement pipes with a smooth, continuous, and fluid-impervious coating of uniform thickness over the entire inner surface thereof.

During one operation, the resinous coating material comprised a low density powdered polyethylene, of the type marketed by United States Industrial Chemicals Company under the trade designation MN-710 having a particle size between about 35 and 90 mesh that was dumped by the trough onto the lower portion of the fibro-cement pipe preheated to a temperature of about 400° F. After the dumping of the material, the rotation of the pipe was continued for about 8 revolutions, at which time all of the powdered resinous coating material had melted to form a uniform coating over the entire inner surface of the fibro-cemeent pipe. The coating in melted form had sufficient viscosity to resist flow or slumping, and the coated fibro-cement pipe was moved immediately to a dust free area for cooling and curing of the melted resinous coating material.

In another operation, the resinous coating material comprised a mixture comprising 99 percent of a low density powdered polyethylene marketed by United States Industrial Chemicals Company under the trade designation MN-710 having a particle size between about 20 and 100 mesh; 0.5 percent of a pigment, manufactured by General Aniline and Film Corporation and marketed under the trade designation Heliogen Toner 66-2001 having a particule size of between about 200 and 500 mesh; and an opacifier, such as titanium dioxide, manufactured by Titanium Pigment Company and marketed under the trade designation Titanex AA having a particle size averaging about 0.3 micron. This mixture was spread evenly in a trough 6 and deposited onto the lower portion of a fibro-cement pipe preheated to a temperature of about 400° F. After the dumping of the material, the rotation of the pipe was continued for about 8 revolutions at which time all of the powdered material had melted to form a uniform coating over the entire inner surface of the fibro-cement pipe. The coating in melted form had sufficient viscosity to resist flow or slumping and the coated fibro-cement pipe was moved immediately to a dust free area for cooling and curing of the material.

Another totally unexpected result occurs when using the system of the instant invention in the application of a resinous coating material to the inner surface of a fibro-cement pipe having at least one annular groove with generally radially extending surfaces in its inner surface. In the prior art practices, extreme difficulty was encountered in providing grooves with radially extending surfaces and the associated edges of such grooves with the proper thickness of coating material. In accordance with the method of the instant invention, these difficulties are obviated since all portions of the tubular conduit including those surfaces defining the grooves and their edges will be contacted by substantially the same amount of resinous coating material during the full operation cycle. This is so since the accumulation 10 of the resinous coating material after being dumped on the lower portion of the fibro-cement pipe will have a substantially even horizontal profile on its free exposed surface while its other surface will follow the profile of the inner surface of the fibro-cement pipe. In view of the flow characteristics of the melted resinous coating material, as described above, and the absence of any great amount of centrifugal force in view of the slow rotational speeds, the melted resinous coating material will remain in the position where it melts. Therefore, since all surfaces of the fibro-cement pipe are contacted by the same quantities of dry, powdered resinous coating material, the coating formed by the melting of such resinous coating material will be of uniform thickness on all surfaces. Also, since the accumulation is only gradually changed from the dry, powdered form the the melted form as the fibro-cement pipe is rotated, the final portion of the accumulation remaining in the groove near the end of the entire coating cycle is really an infinitesimal amount. This is clearly illustrated in FIGS. 3-6, inclusive, which illustrate successive intervals during the distribution and transformation of a dry, powdered resnous coating material over the inner surface of a fibro-cement tubular conduit having a pair of spaced annular grooves in the inner surface thereof.

In most instances, it is not necessary to coat the inner surfaces of the above couplings from each axial extremity of the coupling to the near groove. Therefore, it may be desirable to insert plugs into each end of the coupling so that the dry, powdered resinous coating material will only contact those surfaces defining the grooves and the inner surface between the grooves. This modification is not illustrated since it is well within the inventive con-concepts as described above.

Referring to the drawings, there is illustrated in FIG. 4 a tubular conduit comprising a fibro-cement coupling 21 having spaced annular grooves 22 which coupling has been raised to the desired temperature as described above and is supported on the rollers 2 and 3. A quantity of resinous coating material has been dumped onto the lower portion of the fibro-cement coupling 21, and it is being rotated to form an accumulation 10 on the inner surface thereof. As illustrated in FIGS. 4-6, inclusive, the accumulation 10 of resinous coating material is spread axially evenly over an arcuate section of the fibro-cement coupling of about 90°. As described above, portions of the accumulation 10 of the resinous coating material gradually melt to form a coating 24 on the surface of the fibro-cement coupling 21 including the generally radially extending surfaces of the grooves 22 while other portions tumble back upon the next succeeding section of the inner surface of the fibro-cement coupling 21. As illustrated in FIGS. 4-6, inclusive, all portions of the inner surface of the fibro-cement coupling 21 including the generally radially extending surfaces of the annular grooves 22 are contacted by similar quantities of the resinous coating material for substantially the complete coating cycle. As described above, the resinous coating material has no flow characteristics when in melted form so that the resinous coating material remains in the same spot where it melts. In this manner, the accumulation 10 of resinous coating material is gradually spread over the entire inner surface of the fibro-cement coupling including all the surfaces and edges defining the grooves 22.

The foregoing method was used to apply a coating to a plurality of fibro-cement couplings each of which was supported for rotation at a rate of about 10 revolutions per minute. Each coupling comprised an asbestos-cement material having an inner diameter of 24 inches, a wall thickness of 1 inch, and an axial extent of 10 inches. Each annular groove had a depth of about 0.35 inch, an axial extent of about 1 inch, and the centers of the grooves were spaced apart a distance of about 6 inches. A low density, dry, powdered polyethylene, such as the type manufactured by United States Industrial Chemicals Company and marketed under the trade designation MN-710 having a particle size between about 20 and 100 mesh was dumped by the trough 6 onto the lower portion of the fibro-cement coupling which had been preheated to a temperature of 400° F. After the dumping of the resinous coating material, the rotation of each fibro-cement coupling was continued for about 12 revolutions at which time all of the powdered resinous material had melted to form a coating of uniform thickness over the entire surface of the fibro-cement coupling including those surfaces and edges defining the annular grooves. The finished fibro-cement coupling had a uniform coating over the inner surface of the coupling including the axial and radial surfaces of the grooves of about 32 mils.

As stated in the foregoing description, the instant invention is useful in the coating of porous fluid conduits, such as fibro-cement pipe and especially asbestos-cement pipe which is well known and extensively used commercially. A smooth, continuous, and fluid-impervious coating of uniform thickness throughout its entire extent is formed on the inner surface of the fibro-cement pipe when the concepts of the instant invention are followed. The fibro-cement pipes must be raised to a temperature great enough so that the resinous coating material will be gradually melted and adhered to the inner surface of the fibro-cement pipe. However, the temperature must not be so great to cause too rapid a melting of the powdered resinous coating material. The speed of rotation of the fibro-cement pipe during the application and distribution of the resinous coating material must be closely regulated so as to avoid any tendency of the resinous coating material while in dry, powdered form, to be held in a fixed position on the fibro-cement pipe by centrifugal force, but the speed of rotation must be sufficiently great to provide the proper distribution of the resinous coating material over an arcuate section of the fibro-cement pipe so as to obtain the desired flow back and gradual melting of the dry, powdered resinous coating material. Another item of great significance is the size of the particles of the dry, powdered resinous coating material. If the particles are too small, they have a tendency to melt too rapidly and it is difficult to obtain a coating of uniform thickness over the entire extent of fibro-cement pipe. If the particles are too large, there is a tendency to form voids and air bubbles on the inner surface of the fibro-cement pipe. When using a polyethylene coating material as described in the above examples, difficulty was experienced if the dry, powdered resinous coating material were of a particle size smaller than 100 mesh or greater than 20 mesh.

While the invention has been described in rather full detail, it will be understood that these details need not be strictly adhered to and that various changes and modifications may suggest themselves to one skilled in the art.

What we claim is:
1. A method for applying a coating material to the inner surface of a tubular conduit comprising:
   (a) mounting a tubular conduit, which is at a temperature greater than the melting point of the coating material to be applied, and at a temperature where the melted coating material has substantially no flow characteristics, for rotation about a horizontal axis, said tubular conduit having in at least one portion thereof two cylindrical surfaces of different inner diameters joined by a generally radially extending wall,
   (b) inserting within said tubular conduit a trough carrying a supply of coating material in dry, flowable particulate form which forms a highly viscous liquid exhibiting little or no flow characteristics at said temperature,
   (c) depositing said coating material onto the inner surface of the said tubular conduit to form an accumulation of said coating material on a minor arcuate section of said inner surface along the axial extent of said tubular conduit,
   (d) rotating said tubular conduit at a rotational speed less than the rotational speed at which said accumulation of coating material would be held in deposited position by centrifugal force so that portions of said accumulation of coating material will fall back over the next succeeding arcuate sections of the inner surface of said tubular conduit in a direction opposite to the direction of rotation of said tubular conduit while other portions of said accumulation of said coating material melt and adhere to said inner surface,
   (e) maintaining the radially inner surface of said accumulation of coating material upon only axially extending line substantially even to said horizontal axis and the radially outward surface of said accumulation of coating material following the contours of said inner surface of said tubular conduit so that said coating material contacts all surfaces of said tubular conduit including said two cylindrical surfaces of different diameters and said generally radially extending wall by substantially the same period of time, and
   (f) continuing the rotation of said tubular conduit until all of said accumulation of coating material has been changed into a uniform coating over the entire surface of said tubular conduit.
2. A method as defined in claim 1 wherein said coating material comprises:
   a thermoplastic resin.

References Cited

UNITED STATES PATENTS

| 2,688,563 | 9/1954 | Kieffer | 117—18 X |
| 2,737,461 | 3/1956 | Heisler et al. | 117—18 |
| 3,056,692 | 10/1962 | Kitada | 118—318 X |
| 3,207,618 | 9/1965 | De Hart | 117—18 |
| 3,230,105 | 1/1966 | Spraul | 117—18 |
| 3,303,041 | 2/1967 | Thompson | 117—18 |
| 3,376,151 | 4/1968 | Okamoto et al. | 117—18 |
| 3,376,152 | 4/1968 | Okamoto et al. | 117—18 |
| 3,380,433 | 4/1968 | Gerlovich | 117—21 X |

WILLIAM D. MARTIN, Primary Examiner

PAUL F. ATTAGUILE, Assistant Examiner

U.S. Cl. X.R.

117—21; 138—145